US012526478B2

United States Patent
Panchaksharaiah et al.

(10) Patent No.: US 12,526,478 B2
(45) Date of Patent: Jan. 13, 2026

(54) SYSTEMS AND METHODS FOR DETERMINING TYPES OF REFERENCES IN CONTENT AND MAPPING TO PARTICULAR APPLICATIONS

(71) Applicant: Adeia Guides Inc., San Jose, CA (US)

(72) Inventors: Vishwas Sharadanagar Panchaksharaiah, Tumkur District (IN); Vikram Makam Gupta, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/395,648

(22) Filed: Aug. 6, 2021

(65) Prior Publication Data

US 2023/0049120 A1 Feb. 16, 2023

(51) Int. Cl.
H04N 7/173 (2011.01)
G06V 20/40 (2022.01)
H04L 67/125 (2022.01)
H04N 21/45 (2011.01)
H04N 21/466 (2011.01)

(52) U.S. Cl.
CPC ......... *H04N 21/4668* (2013.01); *G06V 20/41* (2022.01); *H04L 67/125* (2013.01); *H04N 21/4532* (2013.01)

(58) Field of Classification Search
CPC ........... H04N 21/4668; H04N 21/4532; G06V 20/41; H04L 67/125
See application file for complete search history.

(56) References Cited

U.S. PATENT DOCUMENTS

| | | | |
|---|---|---|---|
| 9,462,028 B1 * | 10/2016 | Levinson | H04L 65/765 |
| 9,564,063 B1 * | 2/2017 | Hunt | G11B 27/036 |
| 10,795,933 B1 * | 10/2020 | Langley | G06N 5/046 |
| 10,803,038 B2 * | 10/2020 | Chen | H04N 21/812 |
| 11,032,620 B1 * | 6/2021 | Verma | H04N 21/4828 |
| 2011/0145256 A1 * | 6/2011 | Dunkel | H04N 21/23418 707/743 |

(Continued)

FOREIGN PATENT DOCUMENTS

| | | |
|---|---|---|
| CN | 107977445 A | 5/2018 |
| CN | 110889003 A | 3/2020 |

(Continued)

*Primary Examiner* — Annan Q Shang
(74) *Attorney, Agent, or Firm* — HALEY GUILIANO LLP

(57) ABSTRACT

Systems and methods are provided herein for determining types of references within a content item and mapping them to particular applications. A content management application identifies an entity and a context of the entity at a location within the content item. The content management application may identify the entity and the context of the entity in real time as a first user device processes the content item, or the content management application may identify and store the entity and the context of the entity in a database before providing the content item. After determining a presence of a second user device associated with a profile, the content management application determines at least one application associated with the entity and the context of the entity on the second user device and launches the application to create an immersive content consumption experience.

20 Claims, 8 Drawing Sheets

(56) References Cited

U.S. PATENT DOCUMENTS

| | | | |
|---|---|---|---|
| 2011/0282906 A1* | 11/2011 | Wong | G06F 16/784 |
| | | | 707/E17.03 |
| 2014/0259037 A1* | 9/2014 | Belyaev | H04N 21/4622 |
| | | | 725/14 |
| 2015/0067724 A1* | 3/2015 | Johnson | H04N 21/4668 |
| | | | 725/32 |
| 2015/0237412 A1* | 8/2015 | Shimy | H04N 21/44218 |
| | | | 725/12 |
| 2016/0191979 A1* | 6/2016 | Perinchery | H04N 21/4668 |
| | | | 725/61 |
| 2017/0201791 A1 | 7/2017 | Fu | |
| 2017/0235828 A1* | 8/2017 | Philipose | H04N 21/2665 |
| | | | 725/115 |
| 2017/0302979 A1* | 10/2017 | Kaya | H04N 21/234 |
| 2018/0007450 A1* | 1/2018 | Grant | H04N 21/440263 |
| 2019/0090014 A1 | 3/2019 | Shoop | |
| 2019/0289359 A1* | 9/2019 | Sekar | H04N 21/4333 |
| 2020/0077155 A1* | 3/2020 | Bryant | G06F 16/735 |
| 2020/0213662 A1* | 7/2020 | Wolcott | H04N 21/4131 |
| 2021/0227280 A1 | 7/2021 | Moros Ortiz et al. | |
| 2021/0279470 A1* | 9/2021 | Zadeh | G06F 11/327 |
| 2022/0239988 A1* | 7/2022 | Yang | H04N 21/4725 |

FOREIGN PATENT DOCUMENTS

| | | |
|---|---|---|
| CN | 110929030 A | 3/2020 |
| EP | 3448046 A1 | 2/2019 |

\* cited by examiner

SYSTEMS AND METHODS FOR DETERMINING TYPES OF REFERENCES IN CONTENT AND MAPPING TO PARTICULAR APPLICATIONS

BACKGROUND

The present disclosure relates to systems and methods for determining types of references in content and, more particularly, to mapping the references in content to particular applications on a user device.

SUMMARY

Part of the attraction to going to the movies is the immersive experience that comes with it; the towering 1,200 square foot screen stretching the length of the wall, the thundering IMAX surround sound system, and the utter darkness of the theatre all enhance the immersive experience, making viewers truly believe they are a part of the film. Content providers are attempting to mimic this same immersive effect since a growing demographic of viewers have exchanged cable television for over-the-top (OTT) content. Viewers crave more than just an enticing plot. Within the comfort of their own home, viewers wish to feel completely immersed in the content they are watching.

Content providers, compared to movie theatres, are limited in how they can provide a more immersive viewing experience. Not every viewer can watch their OTT content on a 50-inch flat screen television, not every viewer has a surround sound system in their home, and not every viewer will consume their OTT content in a dark, quiet environment, so content providers need a way to further immerse their viewers in addition to an intriguing plot. The systems and methods of the present disclosure identify an entity and a context of the entity within a content item on a first user device that is associated with a profile. According to an example, the systems and methods include identifying a second user device (e.g., mobile computing device, appliance, etc.) on a computer network or otherwise associated with the profile of the first device, mapping the entity and the context of the entity to at least one application on the second user device, and launching the application upon a user selection. For example, if a user were to watch a content item and a character in the content item was eating a bowl of popcorn, the systems and methods would identify the entity as "Popcorn," identify the context of the entity as "Cook/Make," and map the entity and the context of the entity to the second user device (e.g., a smart microwave) associated with the profile and at least one application on the second user device (e.g., hardware, software, or both that control operation of a popcorn setting) associated with the entity and the context of the entity to set the appropriate settings to make popcorn.

The systems and methods described herein apply not only to network-connected appliances, but also to any computing device (e.g., mobile device) capable of connecting to a network or being controlled by another device. For example, the systems and methods described herein may identify an entity (e.g., Queensland) and a context of the entity (e.g., Drive to) within a content item on a first user device that is associated with a profile. In this example, the systems and methods identify a second user device (e.g., a mobile device) on a computer network, map the entity and the context of the entity (e.g., Drive to Queensland) to the second user device associated with the profile with at least one application (e.g., "Maps") associated with the entity and the context of the entity. Upon user selection, the application launches and charts a path from either the user's location, or a location of a character in the content item, to Queensland. In some embodiments, the identification of the entity and the context of the entity happen in real time as the first user device processes the content item. If desired, the entity and the context of the entity may be identified dynamically as the content item is being consumed (e.g., on a scene-by-scene or frame-by-frame basis). For such embodiments, identifying the entity within the content item may include at least one of processing closed captioning, using natural language processing on the content item, or using computer vision technique(s) on the content item. In addition, the identifying the entity at a location within the content item may be triggered by a user action (e.g., pausing the content item, fast forwarding or rewinding the content item, adjusting the playback speed). In some embodiments, the identification of the entity at the location within the content item is stored prior to providing the content item.

The techniques disclosed herein allow a consumer to replicate what characters are doing in a segment of the content item in their own home, thus providing a more immersive viewing experience where consumers feel included in the scene they are watching.

The systems and methods disclosed herein describe providing an immersive content consumption experience for a user. The system provides a content item on a first user device associated with a profile. The system identifies an entity at a location within the content item and identifies a context of the entity at the location within the content item. The system determines a second user device associated with the profile and determines at least one application on the second user device. The system determines that the second user device and the at least one application are associated with the entity and to the context. The system causes an action to be performed at the second user device by the at least one application, wherein the action is associated with the entity and the context.

As described above, the content item may be provided on a first user device associated with the profile. For example, a user may access the content item (e.g., log on to an OTT provider) on the first user device (e.g., a computing device) connected to a computer network (e.g., a Wi-Fi network). The first user device may be associated with the profile (e.g., a user's OTT account, a user's computer network, etc.). In addition, the system may provide a selectable option on the display of the first user device associated with the entity and the context of the entity (e.g., Drive to Queensland). Upon a user selection, the selectable option on the display of the first user device may cause the system to determine the at least one application on the second user device associated with the entity and the context of the entity (e.g., "Maps").

The system may identify an entity at a location within the content item and may identify a context of the entity at the location within the content item. For example, if a character in a content item were to eat a bowl of popcorn, the system may identify the entity as "Popcorn" and may identify the context of the entity as "Cook/Make." The identification of the entity and the context of the entity may happen in real time as the first user device processes the content item. If desired, the entity and the context of the entity may be identified dynamically as the content item is being consumed (e.g., on a scene-by-scene or frame-by-frame basis). Further, identifying the entity within the content item may comprise at least one of processing closed captioning, using natural language processing on the content item, or using computer vision technique on the content item. The identifying the entity at the location within the content item may be triggered by a user action (e.g., pausing the content item, fast forwarding or rewinding the content item, adjusting the playback speed), and the identification of the entity at the location within the content item may be stored at a storage device prior to providing the content item.

The system may determine a second user device associated with the profile. For example, the system may determine a presence of a second user device in the vicinity of the first user device or connected to the user's Wi-Fi network (i.e., the user's computer network) shared with the first user device. Moreover, the second user device may be an appliance associated with the profile. For example, a smart coffee maker may be connected to the user's Wi-Fi network (i.e., the user's computer network).

The system may determine at least one application on the second user device and may determine that the second user device and the at least one application are associated with the entity and the context. For example, if a character in a content item were to drive to Los Angeles, the system may identify the entity as "Los Angeles," may identify the context of the entity as "Drive to," and, after determining the second user device associated with the profile, may determine that a "Maps" application on the second user device is associated with the entity and the context of the entity (e.g., Drive to Los Angeles). In another example, if a character in a content item were to make a cup of coffee, the system may identify the entity as "Coffee," may identify the context of the entity as "Brew," and, after determining the second user device associated with the profile, may determine that a "Cappuccino" application on a smart coffee maker is associated with the entity and the context of the entity (e.g., Brew Coffee).

The system may cause an action to be performed at the second user device by the at least one application, wherein the action is associated with the entity and the context. For example, as described above, after determining that the "Maps" application on the second user device is associated with the entity (e.g., Los Angeles) and the context of the entity (e.g., Drive to), the system may launch the "Maps" application to chart a path from either the user's location, or the character's location in the content item, to Los Angeles. In another example, as described above, after determining that the "Cappuccino" application on the smart f maker is associated with the entity (e.g., Coffee) and the context of the entity (e.g., Brew), the system may launch the "Cappuccino" application to make a cappuccino for the user upon user selection. In an instance where the at least one application on the second user device is launched, a command in a format recognizable by at least one of the second user device or the at least one application may be necessary to perform the action.

BRIEF DESCRIPTION OF THE DRAWINGS

The above and other objects and advantages of the disclosure will be apparent upon consideration of the following detailed description, taken in conjunction with the accompanying drawings, in which.

Figure 1:
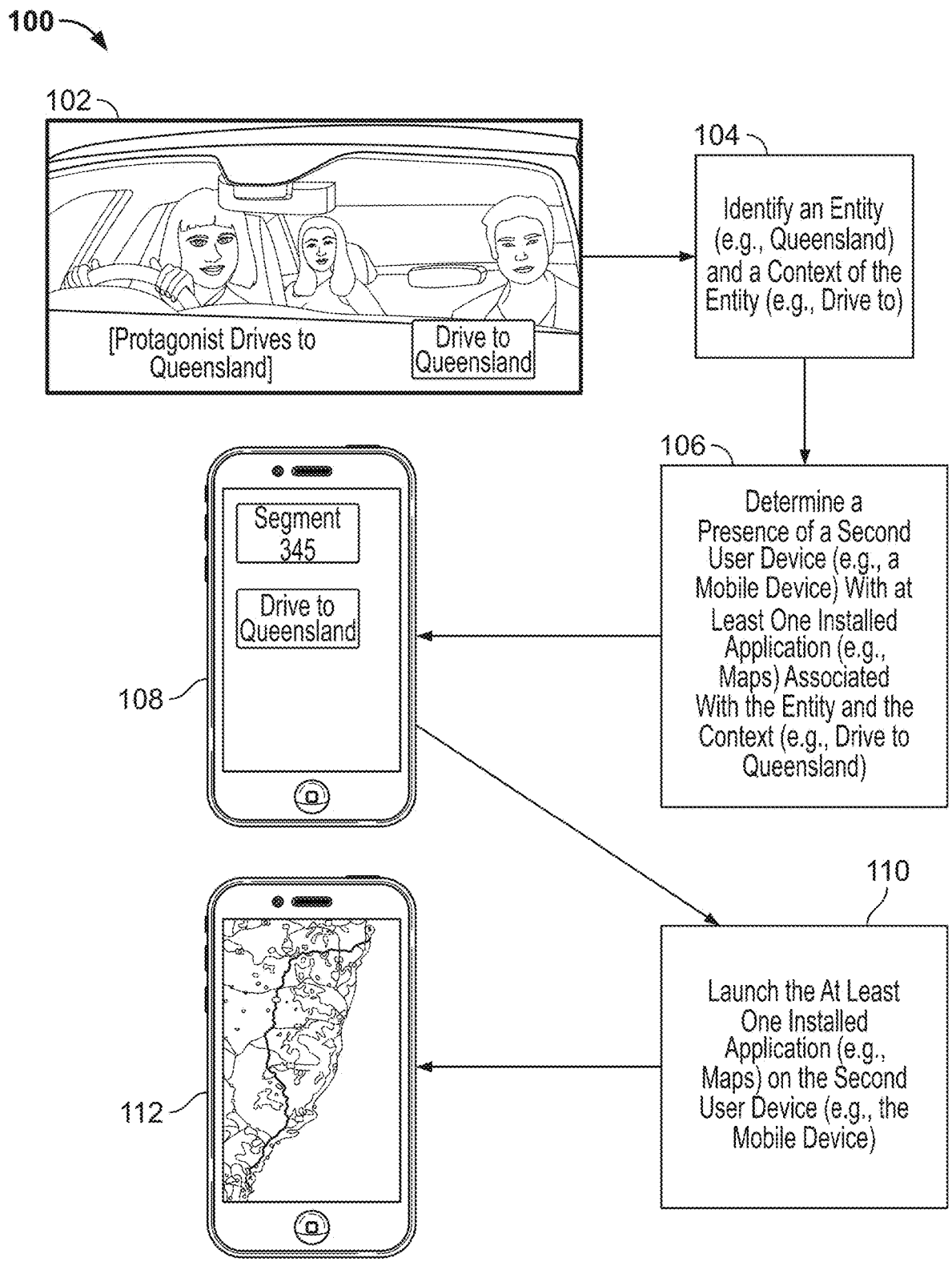
FIG. 1 shows an example of a scenario for mapping an entity and a context of the entity to at least one application on a second user device, in accordance with some embodiments of the present disclosure.

The figures herein depict various embodiments of the disclosure for purposes of illustration only. It will be appreciated that additional or alternative structures, systems, and methods may be implemented within the principles set out by the present disclosure.

DETAILED DESCRIPTION

Methods and systems are provided herein for determining types of references in content and mapping the references in the content to particular applications on a user device. Computer-readable media may encode the methods and/or any instructions for performing any of the embodiments discussed herein. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

As referred to herein, a "media guidance application" is an application that provides media guidance data to a user through an interface. For example, a media guidance application may allow users to efficiently navigate content selections and easily identify content that they may desire. Computer-readable media may encode the media guidance application and/or any instructions for performing any of the embodiments discussed herein.

As referred to herein, the phrase "metadata" should be understood to mean any data related to content, or data used in operating the content item. For example, the data may include program information, playlist information, bitrate variant information, segment information, selection information, user preferences, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of data that is helpful for a user to navigate among and locate desired content selections.

As referred to herein, the term "content item" should be understood to mean any segment of media content, although it can also be something other than media.

As referred to herein, the term "content" should be understood to mean any content (e.g., part of a content item or a whole content item) an entity and a context of an entity are based from. For example, a user may watch content (e.g., a scene of a content item) where a character eats a slice of pizza, prompting the content management application to generate "Pizza" as the entity and "Cook" as the context of the entity. "Content" may be received from a content database.

As referred to herein, the term "media content" should be understood to mean any content received from a media content source, although it can also be something not received from a media content source.

As referred to herein, the term "entity" should be understood to mean any object, location, biometric, or consumable content within the content describe above, such as food, drink, clothes, shoes, wearable items, currency, cities, landmarks, places, heart rate, fitness, or music.

As referred to herein, the term "context" should be understood to mean any situational information within the content item associated with the particular entity (e.g., object, location, biometric, or consumable content). For example, if the entity is "Pizza" the context may be "Cook," if the entity is "Coffee" the context may be "Brew," if the entity is "Queensland," or some other place, the context may be "Drive to" or "Travel to," if the entity is "Heart Rate" the context may be "Monitor," and if the entity is "Music" the context may be "Listen to."

As referred to herein, the term "appliance" should be understood to mean any network-connected device that is generally a non-content consumable device, such as a smart coffee maker, a smart oven, a smart refrigerator, a smart dishwasher, a smart microwave, or a smart watch.

As referred to herein, the term "timeline" should be understood to mean a dynamic playback progress tool that monitors how much time has passed and how much time remains in a content item.

As referred to herein, the terms "location" or "position" should be understood to mean a user's viewing progress within a timeline of a content item.

As referred to herein, the term "application" should be understood to mean any suitable hardware or software that performs a particular task.

As referred to herein, the term "action" should be understood to mean an implementation of an application to perform a particular task.

As referred to herein, the phrase "user action" should be understood to mean a user trick play selection during a content item.

As referred to herein, the term "content management application" should be understood to mean any hardware or software that works with computing systems, such as systems described herein.

As referred to herein, the phrase "user device" should be understood to mean any device that accesses or interacts with the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, a network-enabled appliance, or any other television equipment, computing equipment, computing device, or wireless (i.e., mobile) device, and/or combination of the same.

As referred to herein, the phrase "user equipment device" should be understood to mean any device on the local end of a user, including user devices.

As referred to herein, the term "profile" should be understood to mean any type of user authentication that accesses a communications network, such as a system account logon, an interactive logon, a network logon, a batch job logon, a service logon, a proxy, or an unlock logon. In addition, "profile" should be understood to include, for example, a computer network, a local area network (LAN), a metropolitan area network (MAN), a wide area network (WAN), a wireless network, or an inter network.

As referred to herein, the term "presence" should be understood to mean a detection of a user device, for example, associated with a profile.

As referred to herein, the phrase "processing circuitry" should be understood to mean circuitry, hardware and/or software, a part of control circuitry that instructs or controls a user device, for example, that accesses the content described above. Inputs for the "processing circuitry" may be a user input interface, a display, speakers, a database, storage (e.g., RAM, ROM, Hard Disk, Removable Disk, etc.), or an input/output (I/O) path. The "processing circuitry" may communicate with either other circuitry or a communications network to perform its function.

FIG. 1 shows an example of a scenario for mapping an entity and a context of the entity to at least one application 112 on a second user device 108, in accordance with some embodiments of the present disclosure. In some embodiments, a user may watch a content item via a first user device 102 (e.g., a television). A scene may appear where a character of the content item drives to Queensland, which prompts the content management application to identify the entity as "Queensland" and the context of the entity as "Drive to." Consequently, upon determining a presence of the second user device 108, the content management application may map the entity and the context of the entity (e.g., Drive to Queensland) to at least one application (e.g., "Maps") associated with the entity and the context of the entity on the second user device 108. In some embodiments, one or more parts of or the entirety of the first user device 102 and the second user device 108 are configured as a system implementing various features, processes, and components of FIGS. 2-8. The content management application may include control circuitry that provides the content item, identifies the entity and the context of the entity within the content item, and maps, after determining a presence of the second user device 108, the entity and the context of the entity to the at least one application 112 on the second user device 108. The content management application may receive the content item from either a media content source or a content database via a communications network. The user may access the content item via a user input interface (e.g., a touchscreen display) presented on a display. In some embodiments, the content item may represent a live media content item accessed by a media guidance application. In some embodiments, the content item may represent video-on-demand (VOD) content. In further embodiments, the content item may represent over-the-top (OTT) content.

The content management application identifies the entity and the context of the entity at step 104. For example, if the character in the content item were to drive to Queensland, the content management application may identify the entity as "Queensland" and identify the context of the entity as "Drive to." In some embodiments, the identification of the entity and the context of the entity may happen in real time as the content management application processes the content item. If desired, the content management application may identify the entity and the context of the entity dynamically as the user consumes the content item (e.g., on a scene-by-scene or frame-by-frame basis). For such embodiments, identifying the entity within the content item may include at least one of processing closed captioning, using natural language processing on the content item, or using computer vision technique on the content item. In some embodiments, the content management application may store information about the identified entity at a location within the content item and about the identified context of the entity at the location within the content item. In some embodiments, a user action (e.g., pausing the content item, fast forwarding or rewinding the content item, adjusting the playback speed) may trigger the identification of the entity at the location within the content item. In some embodiments, the content management application may store the identification of the entity at the location within the content item prior to providing the content item. In some embodiments, the user may select an option on a display of the first user device 102 comprising the entity and the context of the entity. In some embodiments, the content management application may present the entity and the context of the entity along the timeline of the content item. If desired, the content management application may present the entity and the context of the entity on top of the scene itself, as metadata, or as hashtags. In further embodiments, advertisers can cause the appearance of certain entities to trigger an action on the second device 108.

At step 106, the content management application determines the presence of the second user device 108 with the at least one application 112 associated with the entity and the context of the entity. For example, if the character in the content item were to drive to Queensland, the content management application may identify the entity as "Queensland," identify the context of the entity as "Drive to," and, after determining the second user device 108 associated with a profile, determine that a "Maps" application on the second user device 108 associates with the entity and the context of the entity (e.g., Drive to Queensland). In some embodiments, the at least one application 112 may be installed on the second user device 108. The content management application may determine the presence of the second user device 108 in the vicinity of the first user device 102 or connected to the user's Wi-Fi network (i.e., the user's computer network) shared with the first user device 102. If in the vicinity of each other, the first device 102 may connect to the second device 108 via Bluetooth, Wi-Fi direct, near-field communication (NFC), Bluetooth low-energy (BLE), Zigbee, Z-Wave, 6LoWPAN, GSM, LTE, LoRa, NB-IoT, or LTE-M. In some embodiments, the second user device 108 does not need to be in the vicinity of the first user device 102 to launch the at least one application 112. For example, a second Wi-Fi network (i.e., a second profile), 5 miles away from the Wi-Fi network mentioned above, may connect the second user device 108 to the network with a separate first user device. In this instance, a separate content management application may identify an entity and a context of the entity at a location within a content item, determine the second user device 108 associates with the profile and at least one application on the second user device 108 that associates with the entity and the context of the entity, and launch the at least one application on the second user device 108 upon user selection.

At step 110, the content management application 102 launches the at least one application 112 on the second user device 108. For example, as described above, after determining the "Maps" application on the second user device 108 associates with the entity and the context of the entity (e.g., Drive to Queensland), the content management application may launch the "Maps" application to chart a path from either the user's location, or the character's location in the content item, to Queensland. The at least one application 112 may include installed applications, applications executing on the second user device 108, and/or otherwise providing instructions to the second user device 108 to execute a function. In some embodiments, a command in a format recognizable by at least one of the second user device 108 or the at least one application 112 may be utilized to perform the action.

Figure 2:
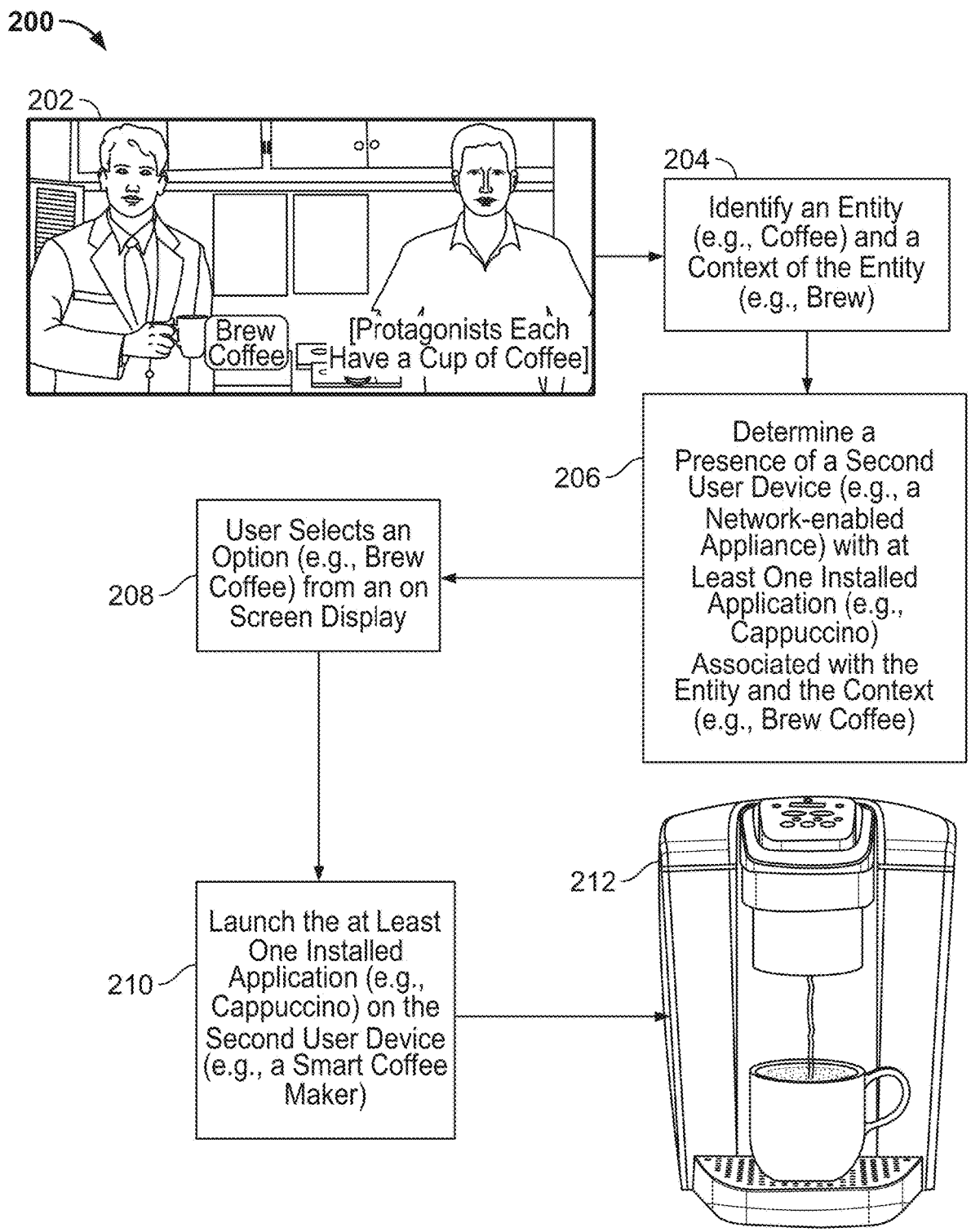
FIG. 2 shows an example of a scenario for mapping an entity and a context of the entity to at least one application on an appliance, in accordance with some embodiments of the present disclosure.

FIG. 2 shows an example of a scenario for mapping the entity and the context of the entity to the at least one application on an appliance 212, in accordance with some embodiments of the present disclosure. In some embodiments, the user may watch the content item via the first user device 202. A scene may appear where the characters of the content item each enjoy a cup of coffee, which prompts the content management application to identify the entity as "Coffee" and the context of the entity as "Brew." Consequently, upon determining the presence of the appliance 212, the content management application may map the entity and the context of the entity (e.g., Brew Coffee) to at least one application (e.g., "Cappuccino") associated with the entity and the context of the entity on the appliance 212 (e.g., smart coffee maker). In some embodiments, one or more parts of or the entirety of the first user device 202 and the appliance 212 are configured as a system implementing various features, processes, and components of FIG. 1 and FIGS. 3-8. The content management application may include control circuitry that provides the content item, identifies the entity and the context of the entity within the content item, and maps, after determining the presence of the appliance 212, the entity and the context of the entity to the at least one application (e.g., "Cappuccino") on the appliance 212. The content management application may receive the content item from either the media content source or the content database via the communications network. The user may access the content item via the user input interface (e.g., a touchscreen display) presented on the display. In some embodiments, the content item may represent the live media content accessed by the media guidance application. In some embodiments, the content item may represent video-on-demand (VOD) content. In further embodiments, the content item may represent over-the-top (OTT) content.

The content management application identifies the entity and the context of the entity at step 204. For example, if the characters in the content item were to each have a cup of coffee, the content management application may identify the entity as "Coffee" and identify the context of the entity as "Brew." In some embodiments, the identification of the entity and the context of the entity may happen in real time as the content management application processes the content item. If desired, the content management application may identify the entity and the context of the entity dynamically as the user consumes the content item (e.g., on a scene-by-scene or frame-by-frame basis). For such embodiments, identifying the entity within the content item may include at least one of processing closed captioning, using natural language processing on the content item, or using computer vision technique on the content item. In some embodiments, the content management application may store information about the identified entity at the location within the content item and about the identified context of the entity at the location within the content item. In some embodiments, a user action (e.g., pausing the content item, fast forwarding or rewinding the content item, adjusting the playback speed) may trigger the identification of the entity at the location within the content item. In some embodiments, the content management application may store the identification of the entity at the location within the content item prior to providing the content item. In some embodiments, the user may select an option on a display of the first user device 202 comprising the entity and the context of the entity. In some embodiments, the content management application may present the entity and the context of the entity along the timeline of the content item. If desired, the content management application may present the entity and the context of the entity on top of the scene itself, as metadata, or as hashtags. In further embodiments, advertisers can cause the appearance of certain entities to trigger an action on the second device 108.

At step 206, the content management application determines the presence of the appliance 212 (e.g., the smart coffee maker) with the at least one application (e.g., "Cappuccino") associated with the entity and the context of the entity. For example, if the characters in the content item were to each have a cup of coffee, the content management application may identify the entity as "Coffee," identify the context of the entity as "Brew," and, after determining the appliance 212 (e.g., the smart coffee maker) associated with the profile, determine that a "Cappuccino" application on the appliance 212 (e.g., the smart coffee maker) associates with the entity and the context of the entity (e.g., Brew Coffee). In some embodiments, the at least one application (e.g., "Cappuccino") may be installed on the appliance 212. In some embodiments, the content management application may determine the appliance 212 associated with the profile, where the profile may be the user profile (e.g., an OTT content provider account, a communications network, a computer network, etc.). For example, the content management application may determine the presence of the appliance 212 connected to the user's Wi-Fi network shared with the first user device 202. In some embodiments, the appliance 212 may include any device capable of connecting to a network or being controlled by another device (e.g., a network-connected appliance, the smart coffee maker, a smart microwave, a smart refrigerator, smart dishwasher, etc.). In further embodiments, the content management application may determine the at least one application (e.g., "Cappuccino") associates with the entity and the context of the entity by utilizing comparison circuitry.

At step 208, the user selects an option from an on-screen display of the first user device 202. The option may include the entity and the context of the entity (e.g., Brew Coffee) at the location within the content item. In some embodiments, the user selection may prompt the launch of the at least one application (e.g., "Cappuccino") on the appliance 212 (e.g., the smart coffee maker).

At step 210, the content management application launches the at least one application (e.g., "Cappuccino") on the appliance 212. For example, as described above, after determining the "Cappuccino" application on the appliance 212 (e.g., the smart coffee maker) associates with the entity and the context of the entity (e.g., Brew Coffee), the content management application may launch the "Cappuccino" application to make a cappuccino upon user selection. The at least one application (e.g., "Cappuccino") may include installed applications, applications executing on the appliance 212, and/or otherwise providing instructions to the appliance 212 to execute a function. In some embodiments, the command in the format recognizable by at least one of the appliance 212 (e.g., the smart coffee maker) or the at least one application (e.g., "Cappuccino") may be necessary to perform the action.

The first user device 102 may be interchangeable with the first user device 202.

Figure 3:
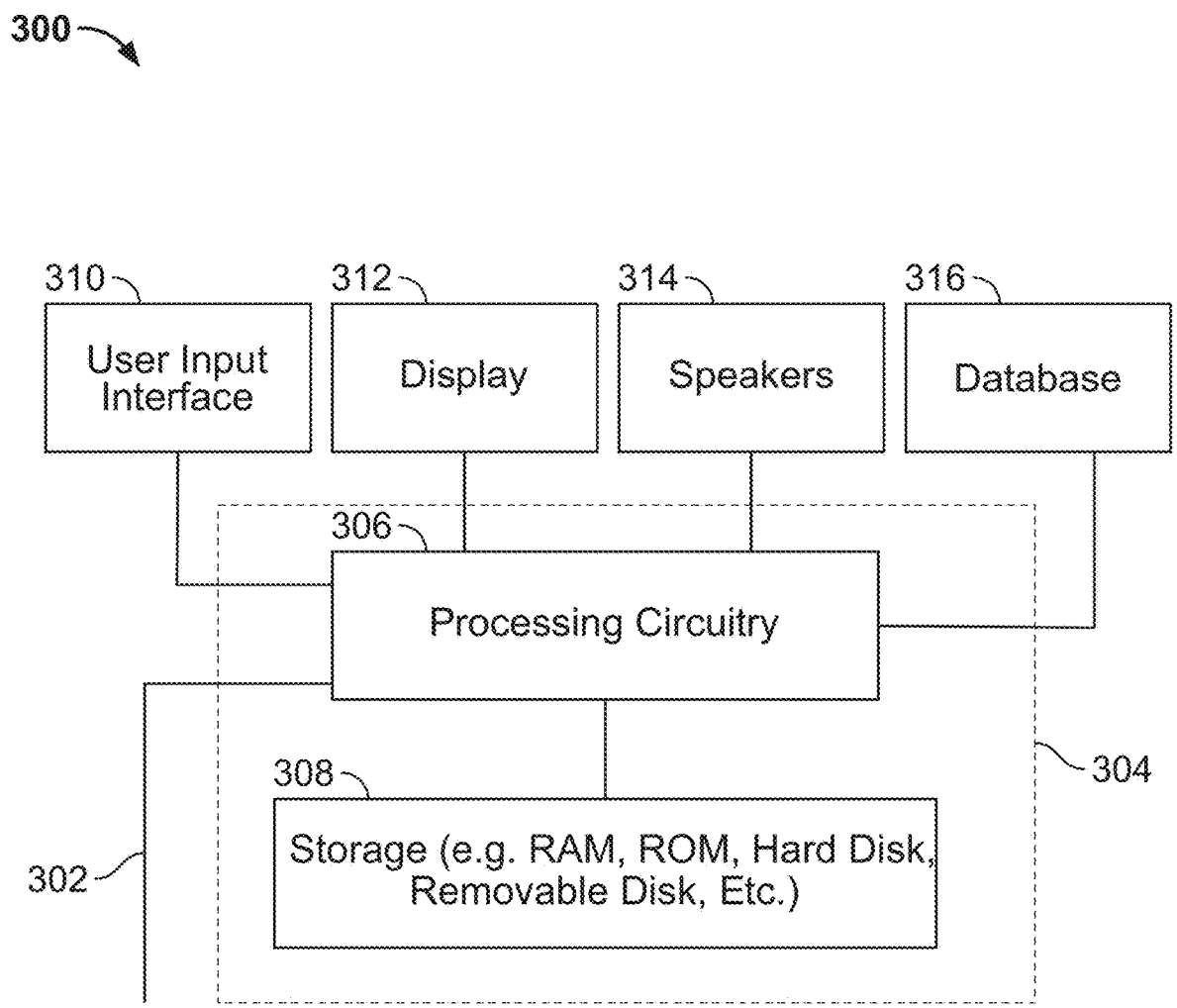
FIG. 3 shows an illustrative depiction of an example computing device, in accordance with some embodiments of the present disclosure.

Users may access content, as described above, and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (I/O) path 302. I/O path 302 may provide content (e.g., media content, content item) and data (e.g., metadata) to control circuitry 304, which includes processing circuitry 306 and storage 308. Control circuitry 304 may send and receive commands, requests, and other suitable data using I/O path 302. I/O path 302 may connect control circuitry 304 (and specifically processing circuitry 306) to one or more communications paths (described below). One or more of these communications paths may provide the I/O functions but are shown as a single path in FIG. 3 to avoid overcomplicating the drawing.

Any suitable processing circuitry, such as processing circuitry 306, may compose control circuitry 304. In some embodiments, control circuitry 304 executes instructions for a content item stored in memory (i.e., storage 308). Specifically, the content management application may instruct control circuitry 304 to perform the functions discussed above and below. For example, the content management application may provide instructions to control circuitry 304 to identify the entity and the context of the entity at the location within the content item. In some implementations, the content management application may prompt any action performed by control circuitry 304.

In client-server based embodiments, control circuitry 304 may include communications circuitry suitable for communicating with a content server or other networks or servers. The content server may store the instructions for carrying out the above-mentioned functionality. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other.

Memory may be an electronic storage device provided as storage 308 that is part of control circuitry 304. Storage 308 may store various types of content described herein as well as metadata described above. Storage 308 may also use nonvolatile memory (e.g., to launch a boot-up routine and other instructions). Cloud-based storage, described in relation to FIG. 4, may supplement storage 308 or replace storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Control circuitry 304 may also provide encoding circuitry (e.g., for converting over-the-air, analog, or digital signals to MPEG signals for storage). Control circuitry 304 may also include scaler circuitry for upsampling and downsampling content into the preferred output format of the user equipment 300. Circuitry 304 may also include digital-to-analog converter circuitry and analog-to-digital converter circuitry for converting between digital and analog signals. The user equipment may use the tuning and encoding circuitry to receive and to display, to play, or to record content. The user equipment may also use the tuning and encoding circuitry to receive metadata. Software running on one or more general purpose or specialized processors may implement the circuitry described herein, including for example, the tuning, video generating, encoding, decoding, encrypting, decrypting, scaler, and analog/digital circuitry. Multiple tuners may handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may associate with storage 308.

The user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces.

User equipment device 300 may provide display 312 as a stand-alone device or integrated with other elements of user equipment device 300. For example, display 312 may be a touchscreen or touch-sensitive display. In such circumstances, display 312 may integrate or combine with user input interface 310. Display 312 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 312 may be HDTV-capable. In some embodiments, display 312 may be a 3D display that presents the content item in 3D. A video card or graphics card may generate the output to the display 312. The video card may offer various functions such as accelerated rendering of 3D scenes and 2D graphics, MPEGS 2/MPEG-4 decoding, TV output, or the ability to connect multiple monitors. The video card may be any processing circuitry described above in relation to control circuitry 304. The video card may integrate with the control circuitry 304. User equipment device 300 may provide speakers 314 as integrated with other elements of user equipment device 300 or may be stand-alone units. The audio component of videos and other content displayed on display 312 may play through speakers 314. In some embodiments, the audio may distribute to a receiver (not shown), which processes and outputs the audio via speakers 314. User equipment device 300 may also incorporate or be accessible to one or more other modules 316. For example, a content database 316 for storing metadata, for example.

The user equipment device may receive the content item generated by the remote server and may display the content item locally on equipment device 300. This way, the processing of the instructions is performed remotely by the server while the resulting content item is provided locally on equipment device 300. Equipment device 300 may receive inputs from the user via input interface 310 and transmit those inputs and/or corresponding instructions to the remote server for processing and generating the associated content item. For example, equipment device 300 may transmit a communication to the remote server indicating that a content item selection was received via input interface 310. The remote server may process instructions in accordance with that input and generate or retrieve a content item corresponding to the input. The generated content item is then transmitted to equipment device 300 for presentation of the content item.

Figure 4:
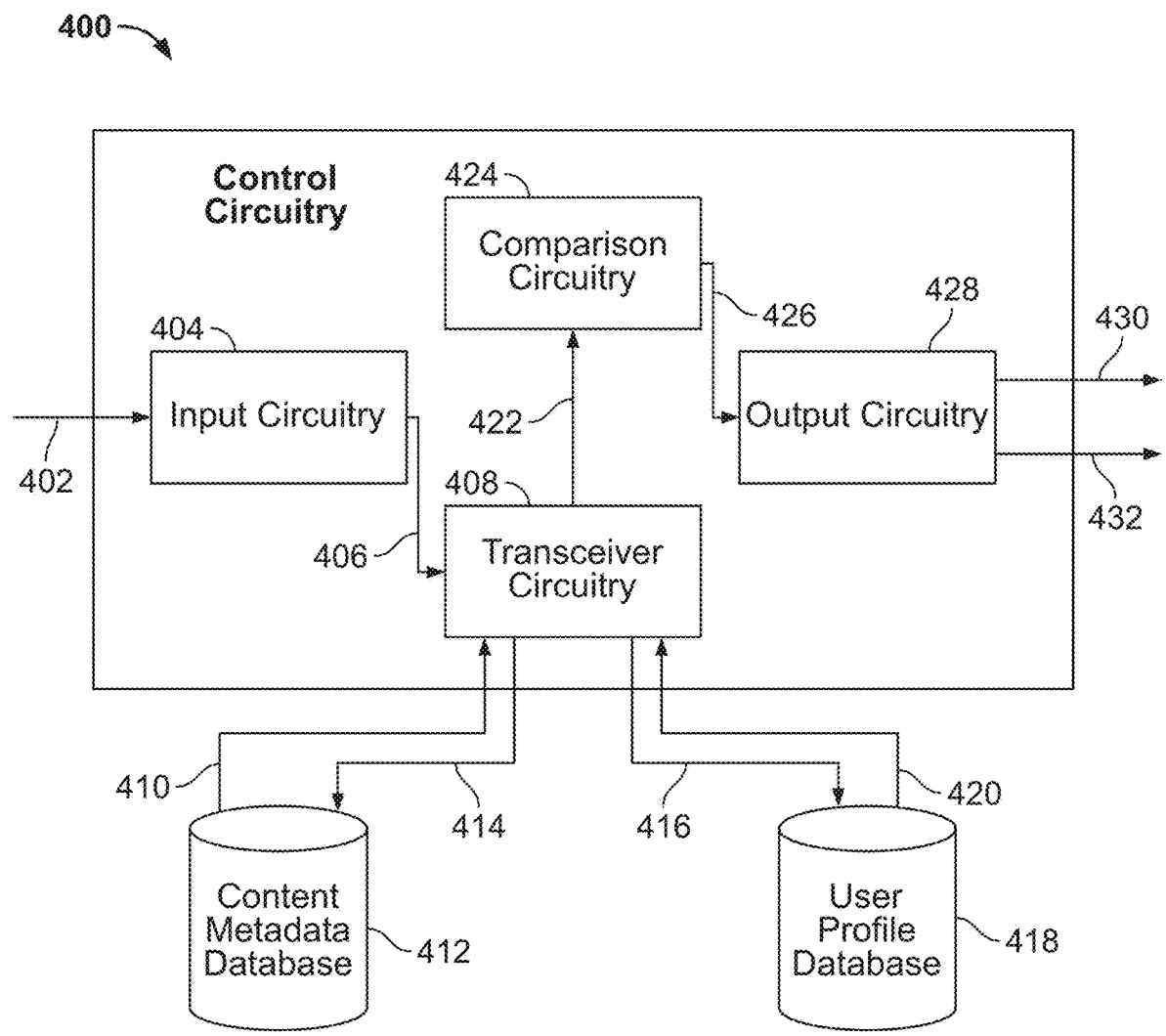
FIG. 4 shows an illustrative depiction of an example control circuitry for a computing device, in accordance with some embodiments of the present disclosure.

FIG. 4 is a block diagram showing components and data flow therebetween of an example system for selectively playing back portions of video and audio of the content item, in accordance with some embodiments of the disclosure. Control circuitry 400 may derive from any suitable processing circuitry and involves control circuits and memory circuits, which may dispose on a single integrated circuit or may be discrete components. The phrase "control circuitry," "input circuitry," "transceiver circuitry," "comparison circuitry," or "output circuitry" should be understood to mean circuitry, hardware and/or software, instructing or controlling any device that accesses the content described above. In particular, the aforementioned phrases should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, phrases above may distribute across multiple separate processors or processing units, for example, multiple of the same type of processing units (e.g., two Intel Core i7 processors) or multiple different processors (e.g., an Intel Core i5 processor and an Intel Core i7 processor).

Control circuitry 400 receives 402, using input circuitry 404, a command to perform an application launch operation. Input circuitry 404 may include, for instance, a microphone and voice processing circuitry for receiving voice commands, infrared receiving circuitry for receiving commands from a remote control device, a touchscreen interface for receiving user interactions with graphical user interface elements (e.g., an on-screen option selection), or any combination thereof or any other suitable input circuitry for receiving any other suitable user input. In response to the command, input circuitry 404 generates a query for metadata of the content item and transmits 406 the query to transceiver circuitry 408 to transmit 414 to content metadata database 412. The query may be a SQL "SELECT" command, or any other suitable query format recognizable by at least one of the second user device 108 or the at least one application 112 of FIG. 1, for example.

Transceiver circuitry 408 may be a network connection such as an Ethernet port, Wi-Fi module, or any other data connection suitable for communicating with a remote server. Transceiver circuitry 408 receives 414 from content metadata database 412, in response to the query, metadata describing segments of the content item. In some embodiments input circuitry 404 also generates a second query for user preference data. Transceiver circuitry 408 transmits 416 the second query to user profile database 418 and receives 420 from user profile database 418, in response to the query, user preference data.

Transceiver circuitry 408 transfers 422 the metadata to comparison circuitry 424. Comparison circuitry 424 identifies the segments of the content item that will be subject to an application mapping operation and may analyze importance levels of audio, textual description or image frames to select for presentation during the application mapping operation. Comparison circuitry 424 may also receive, or have access to, the current playback position and the length of moving window. Once the audio, textual description or image frames have been selected, comparison circuitry 424 transfers 426 the identifiers corresponding to the segments to output circuitry 428. Output circuitry 428 may decrease/increase the speed of video output 430 and, using the identifiers of the segments of the content item, outputs 432 of portions of the content item.

Figure 5:
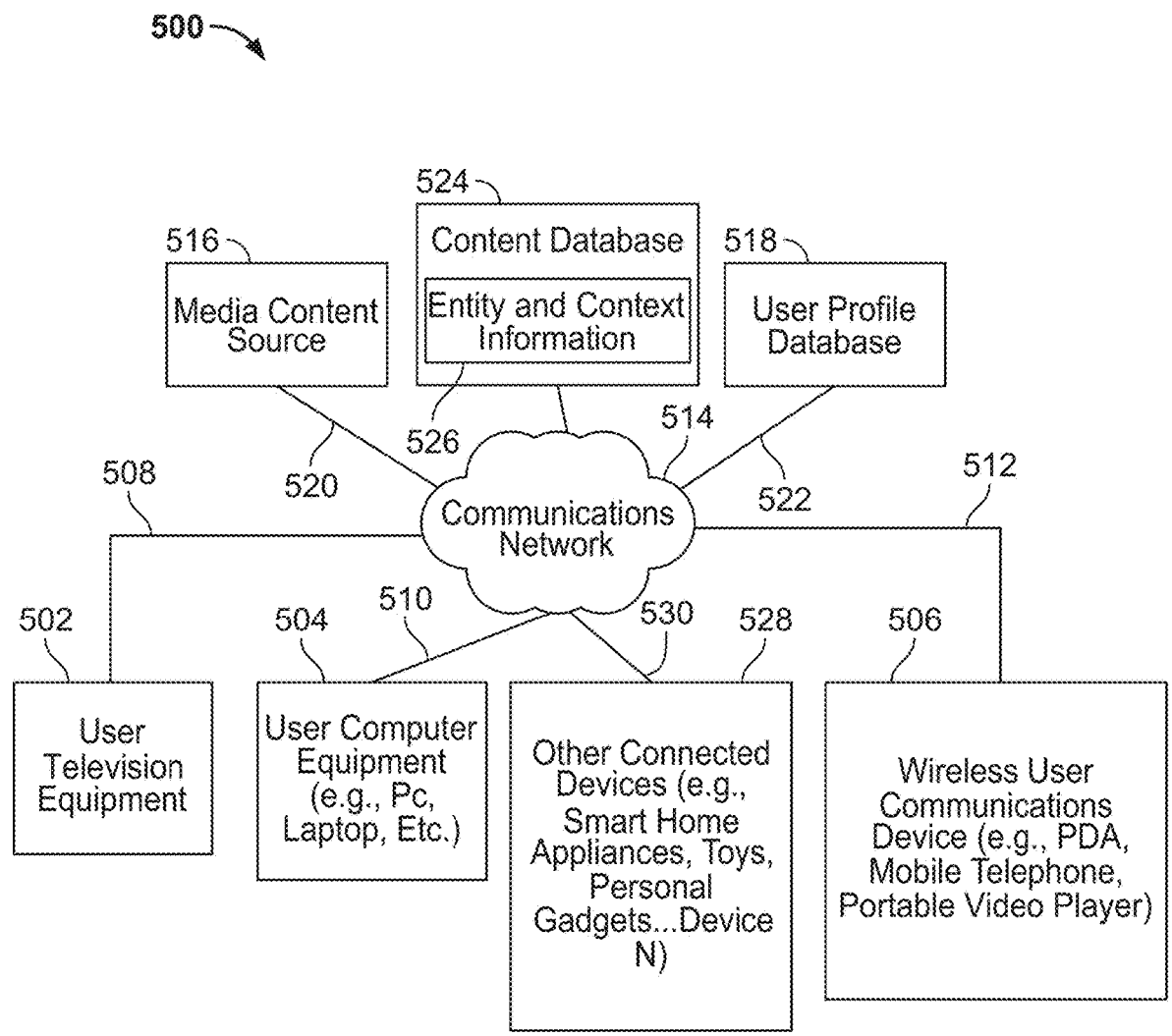
FIG. 5 shows a block diagram of an illustrative user equipment system, in accordance with some embodiments of the present disclosure.

User television equipment 502, user computer equipment 504, wireless user communications device 506, other connected devices 528, any device that can connect to a network or another device can control, or any other type of user equipment suitable for accessing content can implement user equipment device 300 of FIG. 3 in system 500 of FIG. 5. For simplicity, user equipment, or user equipment devices, may refer to these devices herein collectively, and may be substantially similar to user equipment devices described above. User equipment devices may function as a standalone device or may be part of a network of devices. Various network configurations of devices may be implemented and are discussed in more detail below.

The user equipment device utilizing at least some of the system features described above in connection with FIG. 5 may not classify solely as user television equipment 502, user computer equipment 504, other connected devices 528, or wireless user communications device 506. For example, user television equipment 502 may, like some user computer equipment 504, allow for access to Internet content via an Internet connection, while user computer equipment 504 may, like some television equipment 502, include a tuner allowing for access to television programming. The content item may have the same layout on different types of user equipment or may tailor to the display capabilities of the user equipment. For example, on user computer equipment 504, a web browser may provide the content item. In another example, the content item may scale down for wireless user communications devices 506.

In system 500, there may be more than one of each type of user equipment device but only one of each is shown in FIG. 5 to avoid overcomplicating the drawing. In addition, each user may utilize more than one type of user equipment device and also more than one of each type of user equipment device. In some embodiments, "second user device" may refer to the user equipment device (e.g., user television equipment 502, user computer equipment 504, other connected devices 528, or wireless user communications device 506).

The user equipment devices may couple to communications network 514. Namely, user television equipment 502, user computer equipment 504, other connected devices 528, and wireless user communications device 506 may couple to communications network 514 via communications paths 508, 510, 530, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, 530, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Dotted lines may illustrate Path 512 to indicate that in the exemplary embodiment shown in FIG. 5 it is a wireless path, and solid lines may illustrate paths 508, 510, and 530 to indicate they are wired paths (although these paths may be wireless paths, if desired). One or more of these communication paths may provide communications with the user equipment devices but are shown as a single path in FIG. 5 to avoid overcomplicating the drawing.

Although communications paths are not drawn between user equipment devices, these devices may communicate directly with each other via communication paths, such as those described above in connection with paths 508, 510, 530, and 512, as well as other short-range point-to-point communication paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516, content database 524, further including identified entity and context information 526, and user profile database 518 coupled to communications network 514 via communication paths 520, 522, and 532, respectively. In some embodiments, entity and context information 526 may include pairings keyed to time-based location items within the content item. For example, "Drive to Queensland" may appear in a first content segment at time 23:12, "Monitor Heart rate" may appear in a second content segment at time 45:12, and "Cook Lasagna" may appear in a third content segment at time segment 47:42. Paths 520, 522, and 532 may include any of the communication paths described above in connection with paths 508, 510, 530, and 512. Communications may exchange over one or more communications paths but are shown as a single path in FIG. 5 to avoid overcomplicating the drawing. In addition, there may be more than one of each of media content source 516, content database 524 and user profile database 518, but only one of each is shown in FIG. 5 to avoid overcomplicating the drawing. (The different types of each of these sources are discussed below.) If desired, media content source 516, content database 524 and user profile database 518 may integrate as one module. Although communications between sources 516, 524 and 518 with user equipment devices 502, 504, 528, and 506 are shown as through communications network 514, in some embodiments, sources 516, 524, and 518 may communicate directly with user equipment devices 502, 504, 528, and 506 via communication paths (not shown) such as those described above in connection with paths 508, 510, 530, and 512. In some embodiments, media content source 516, user profile database 518, user television equipment 502, user computer equipment 504, other connected devices 528, or wireless user communications device 506 may store at least part of the identified entity and context information 526. In some embodiments, the content management application may identify multiple entities and contexts of entities at any particular location within the content item.

Content source 516 may include one or more types of content distribution equipment including a television distribution facility, cable system headend, satellite distribution facility, content delivery network, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server (i.e., a content server) used to store different types of content (including video content selected by a user), in a location remote from any of the user equipment devices.

Media guidance applications may be, for example, standalone applications implemented on user equipment devices. For example, a software or a set of executable instructions may implement the media guidance application, which storage 308 may store and control circuitry 304 of a user equipment device 300 may execute. In some embodiments, media guidance applications may be client-server applications where only a client application resides on the user equipment device, and server application resides on a remote server. For example, the content management application may implement media guidance applications partially as a client application on control circuitry 304 of user equipment device 300 and partially on a remote server as a server application running on control circuitry of the remote server. When executed by control circuitry of the remote server, the media guidance application may instruct the control circuitry to generate the guidance application displays and transmit the generated displays to the user equipment devices.

Metadata delivered to user equipment devices 502, 504, 528, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. In addition to metadata, providers of OTT content can distribute media guidance applications (e.g., web-based applications or cloud-based applications), or media guidance applications stored on the user equipment device may display the content.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which system 500 may locate centrally or at distributed locations, that provide cloud-based services to various types of users and devices connected via a network such as the Internet via communications network 514. These cloud resources may include one or more content sources and one or more metadata sources and one or more databases. In addition or in the alternative, the remote computing sites may include other user equipment devices, such as user television equipment 502, user computer equipment 504, other connected devices 528, and wireless user communications device 506. For example, the other user equipment devices may provide access to a stored copy of a video or a streamed video.

The user equipment device may access cloud resources using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while the user equipment device may store and run the other applications. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3 and FIG. 4.

Figure 6:
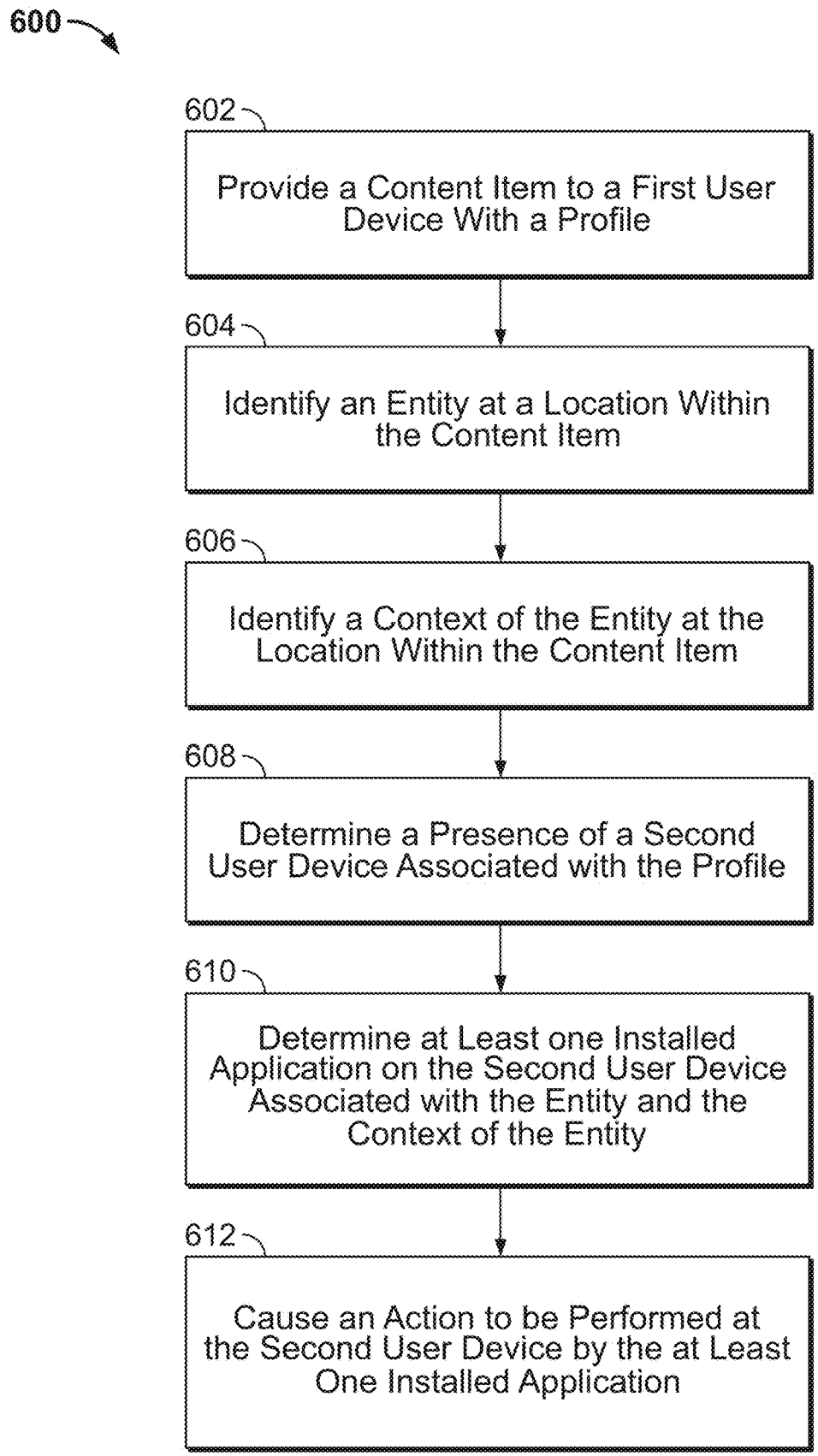
FIG. 6 shows a flowchart of illustrative steps for providing an immersive content consumption experience for a profile, in accordance with some embodiments of the present disclosure.

FIG. 6 shows a flowchart of illustrative steps for providing an immersive content consumption experience for a user, in accordance with some embodiments of the present disclosure. The content management application, including control circuitry, for example, control circuitry 304 or 400, may execute the process 600. The control circuitry may be a part of user equipment (e.g., user television equipment 502, user computer equipment 504, other connected devices 528, or wireless user communications device 506) or of a remote server separated from the user equipment by way of a communications network, or distributed over a combination of both. It should be noted that process 600, or any step thereof, could be performed on, or provided by, any of the devices shown in FIGS. 1-5 and can incorporate various user interfaces (e.g., user input interface 310 of FIG. 3).

The process 600 begins at step 602, where the content management application, involving user equipment (e.g., user television equipment 502, user computer equipment 504, other connected devices 528, or wireless user communications device 506), provides the content item to the first user device associated with the profile. For example, the user may log on to their account (e.g., their profile) for an OTT content provider (e.g., the media content source 516) on any user equipment (e.g., user television equipment 502, user computer equipment 504, other connected devices 528, or wireless user communications device 506) (i.e., the first user device) to access the content item. In addition to the OTT content provider account, the profile may be the user's computer network, Wi-Fi network, or the communications network 514. The content management application may provide the content item for output on display 312, and the user may select which content item they wish to view via the user input interface 310. As another example, the user television equipment 502 may provide the content item by accessing a cloud storage service (e.g., a content database 524) by connecting to a home Wi-Fi network (i.e., the profile).

At step 604, the content management application identifies the entity at the location within the content item. For example, if the character in the content item were to eat a bowl of popcorn, the content management application may identify the entity as "Popcorn" at a location, or position, within the content item. The identification of the entity may happen in real time as the content management application processes the content item. If desired, the content management application may identify the entity dynamically as the user consumes the content item (e.g., on a scene-by-scene or frame-by-frame basis). In some embodiments, identifying the entity within the content item may include at least one of processing closed captioning, using natural language processing on the content item, or using computer vision technique on the content item. The user action (e.g., pausing the content item, fast forwarding or rewinding the content item, adjusting the playback speed) may trigger the identification of the entity at the location within the content item. In some embodiments, the content management application may store the identification of the entity at the location within the content item at a storage device prior to providing the content item. The content database 524 may store the entity of the content item (i.e., entity information 526), and the media content source 516, the user profile database 518, the user television equipment 502, the user computer equipment 504, the other connected devices 528, and the wireless user communications device 506 may store at least part of the entity of the content item (i.e., entity information 526).

At step 606, the content management application identifies the context of the entity at the location within the content item. For example, if the character in the content item were to eat a bowl of popcorn, the content management application may identify the context of the entity as "Cook/Make" at the location within the content item. The identification of the context of the entity may happen in real time as the content management application processes the content item. If desired, the content management application may identify the context of the entity dynamically as the user consumes the content item (e.g., on a scene-by-scene or frame-by-frame basis). In some embodiments, identifying the context of the entity within the content item may involve at least one of processing closed captioning, using natural language processing on the content item, or using computer vision technique on the content item. The user action (e.g., pausing the content item, fast forwarding or rewinding the content item, adjusting the playback speed) may trigger the identification of the context of the entity at the location within the content item. In some embodiments, the identification of the context of the entity at the location within the content item may be stored at a storage device prior to providing the content item. The content database 524 may store the context of the entity of the content item (i.e., context information 526), and the media content source 516, the user profile database 518, the user television equipment 502, the user computer equipment 504, the other connected devices 528, and the wireless user communications device 506 may store at least part of the context of the entity of the content item (i.e., context information 526).

At step 608, the content management application determines the second user device 108 associated with the profile. For example, the content management application may determine the presence of the second user device 108 connected to the user's Wi-Fi network, computer network, or communications network 514. The second user device 108 may be the user television equipment 502, the user computer equipment 504, the other connected devices 528, or the wireless user communications device 506. In addition, the second user device 108 may be any device that can connect to the network or another device can control.

At step 610, the content management application determines at least one application on the second user device 108 associated with the entity and the context of the entity. For example, if the character in the content item were to eat a bowl of popcorn, the content management application may identify the entity as "Popcorn," identify the context of the entity as "Cook/Make," and, after determining the presence of a smart microwave connected to the user's Wi-Fi network, may determine hardware, software, or both that control operation of a "popcorn" setting associate with the entity and the context of the entity (e.g., Cook/Make Popcorn). In some embodiments, the content management application may determine the at least one application (e.g., a smart microwave's "popcorn" setting) associates with the entity and the context of the entity (e.g., Cook/Make Popcorn) by utilizing comparison circuitry 424.

At step 612, the content management application causes the action to be performed at the second user device 108 by the at least one application. For example, as described above, after determining hardware, software, or both that control operation of the "popcorn" setting associate with the entity and the context of the entity (e.g., Cook/Make Popcorn), the content management application may launch the "Popcorn" application on the smart microwave to preset the time and cooking style of the smart microwave for a bag of popcorn. In an instance where the at least one application on the second user device 108 is launched, a command in a format recognizable by at least one of the second user device 108 or the at least one application may be necessary to perform the action. In some embodiments, the command format may be Device: Application: Function: [Parameters]. Table 1 illustrates an exemplary command format that identifies the device, application, function, and parameters that associate with the entity (i.e., data point) and the context of the entity (i.e., type of reference).

TABLE 1

| Content Id | Segment | Time | Data point | Type of reference | Commands |
| --- | --- | --- | --- | --- | --- |
| 12234 | 345 | 23 min 12 sec | Queensland | Drive to | Phone: Google Maps. Navigate: [Start Position, End Position] |

TABLE 1-continued

| Content Id | Segment | Time | Data point | Type of reference | Commands |
| --- | --- | --- | --- | --- | --- |
| 12234 | 456 | 43 min 56 sec | Sydney Correctional Centre | Escape | iPad: TiVo Mobile App: Search: [Sydney Correctional Centre, Escape, Tour] |
| 12234 | 900 | 49 min 13 sec | Coffee | Brew | Coffee Maker: Brew: [Cappuccino, large, no sugar] |

In this example, the entity and the context of the entity "Drive to Queensland," which the content management application identifies at content segment 345 at time 23:12, may map to a mobile device's "Maps" application, allowing the user to navigate from either their location, or the location of the character in the content item, to Queensland. In addition, the entity and the context of the entity "Escape Sydney Correctional Centre," which the content management application identifies at content segment 456 at time 43:56, may map to an iPad's TiVo Mobile application, allowing the user to search for an escape tour at Sydney Correctional Centre. Further, the entity and the context of the entity "Brew Coffee," which the content management application identifies at content segment 900 at time 49:13, may map to a smart coffee maker, allowing the user to brew a large cappuccino with no sugar. The table discussed above is intended to be illustrative and not limiting. Various features, processes, and components of FIGS. 1-5 and FIGS. 7-8 may implement the table discussed above. One skilled in the art would appreciate that the steps discussed above may be omitted, modified, combined, and/or rearranged, and any additional steps may be performed without departing from the scope of the invention.

Figure 7:
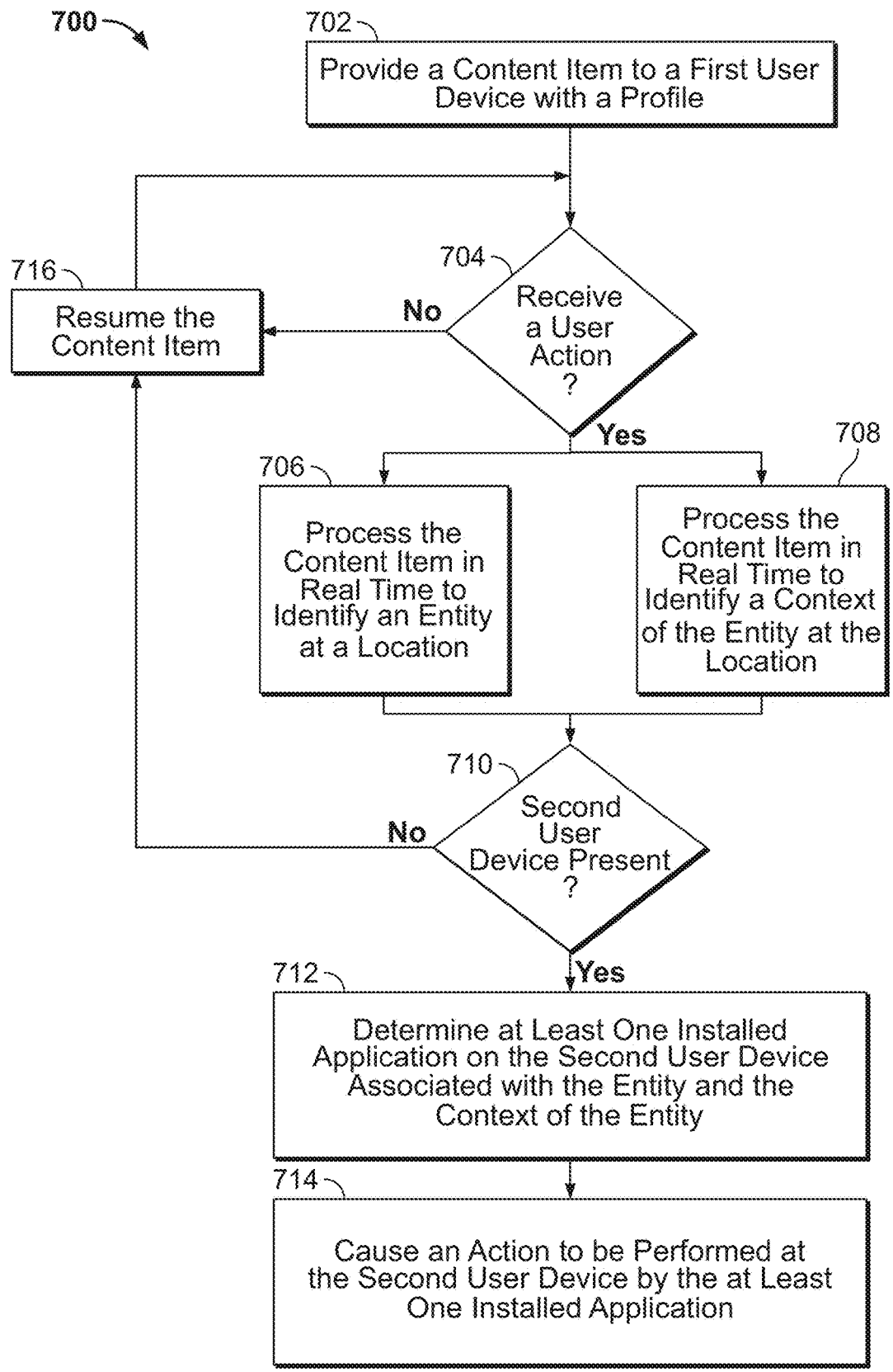
FIG. 7 shows a flowchart of illustrative steps for identifying the entity and the context of the entity in real time as the first user device processes the content item, in accordance with some embodiments of the present disclosure.

FIG. 7 shows a flowchart of illustrative steps for identifying the entity and the context of the entity in real time as the content management application processes the content item, in accordance with some embodiments of the present disclosure. The content management application, including control circuitry, for example, control circuitry 304 or 400, may execute the process 700. The control circuitry may be a part of user equipment (e.g., user television equipment 502, user computer equipment 504, other connected devices 528, or wireless user communications device 506) or of a remote server separated from the user equipment by way of a communications network, or distributed over a combination of both. It should be noted that process 700, or any steps thereof, could be performed on, or provided by, any of the devices show in FIGS. 1-6 and can incorporate various user interfaces (e.g., user input interface 310 of FIG. 3).

The process 700 begins at step 702, where the content management application, involving user equipment (e.g., user television equipment 502, user computer equipment 504, other connected devices 528, or wireless user communications device 506), provides the content item to the first user device with the profile. For example, the user may log on to their account (e.g., their profile) for the OTT content provider (e.g., the media content source 516) on any user equipment (e.g., user television equipment 502, user computer equipment 504, other connected devices 528, or wireless user communications device 506) (i.e., the first user device) to access the content item. In addition to the OTT content provider account, the profile may be the user's computer network, Wi-Fi network, or the communications network 514. The content management application may output the content item for display on display 312, and the user may select which content item they wish to view via the user input interface 310. As another example, the user television equipment 502 may provide the content item by accessing the cloud storage service (e.g., a content database 524) by connecting to the home Wi-Fi network (i.e., the profile).

At step 704, the content management application determines whether the user commits an action (e.g., pausing the content item, fast forwarding or rewinding the content item, adjusting the playback speed). The user may commit the action via the user input interface 310 on display 312. If the content management application determines the user did not commit an action ("No" at 704), the process 700 may proceed to step 716 and resume the content item. If the content management application determines the user did commit an action ("Yes" at 704), the process 700 may proceed to step 706 and step 708.

At step 706, the content management application processes the content item in real time to identify the entity at the location within the content item. For example, if the character in the content item were to visit Sydney Correctional Centre, the content management application may identify the entity as "Sydney Correctional Centre" at the location within the content item. In some embodiments, the content management application may identify the entity dynamically as the user consumes the content item (e.g., on a scene-by-scene or frame-by-frame basis). If desired, identifying the entity within the content item may include at least one of processing closed captioning, using natural language processing on the content item, or using computer vision technique on the content item. The content database 524 may store the entity of the content item (i.e., entity information 526), and the media content source 516, the user profile database 518, the user television equipment 502, the user computer equipment 504, the other connected devices 528, and the wireless user communications device 506 may store at least part of the entity of the content item (i.e., entity information 526).

Concurrently, at step 708, the content management application processes the content item in real time to identify the context of the entity at the location within the content item. For example, if the character in the content item were to visit Sydney Correctional Centre, the content management application may identify the context of the entity as "Escape" at the location within the content item. In some embodiments, the content management application may identify the context of the entity dynamically as the user consumes the content item (e.g., on a scene-by-scene or frame-by-frame basis). If desired, identifying the context of the entity within the content item may include at least one of processing closed captioning, using natural language processing on the content item, or using computer vision technique on the content item. The content database 524 may store the context of the entity of the content item (i.e., context information 526), and the media content source 516, the user profile database 518, the user television equipment 502, the user computer equipment 504, the other connected devices 528, and the wireless user communications device 506 may store at least part of the context of the entity of the content item (i.e., context information 526).

At step 710, the content management application determines the presence of the second user device 108. For example, the content management application may determine the presence of the second user device 108 connected to the user's Wi-Fi network, computer network, or communications network 514. The second user device 108 may be the user television equipment 502, the user computer equipment 504, the other connected devices 528, or the wireless user communications device 506. In addition, the second user device 108 may be any device that can connect to the network or another device can control. If the content management application fails to detect the presence of the second user device 108 ("No" at 710), the process 700 may proceed to step 716 and resume the content item. If the content management application detects the presence of the second user device 108 ("Yes" at 710), the process 700 may proceed to step 712.

At step 712, the content management application determines at least one application on the second user device 108 associated with the entity and the context of the entity. For example, if the character in the content item were to visit Sydney Correctional Centre, the content management application may identify the entity as "Sydney Correctional Centre," identify the context of the entity as "Escape," and, after determining the presence of an iPad connected to the user's Wi-Fi network, may determine that a search engine application associates with the entity and the context of the entity (e.g., Escape Sydney Correctional Centre). In some embodiments, the content management application may determine the at least one application (e.g., the search engine application) associates with the entity and the context of the entity (e.g., Escape Sydney Correctional Centre) by utilizing comparison circuitry 424.

At step 714, the content management application causes an action to be performed at the second user device 108 by the at least one application. For example, as described above, after determining the search engine application associates with the entity and the context of the entity (e.g., Escape Sydney Correctional Centre), the content management application may launch the search engine application on the iPad to search for escape tours at Sydney Correctional Centre. In an instance where the at least one application on the second user device 108 is launched, the command in the format recognizable by at least one of the second user device 108 or the at least one application may be necessary to perform the action. In some embodiments, the command format may be Device: App: Function: [Parameters].

Figure 8:
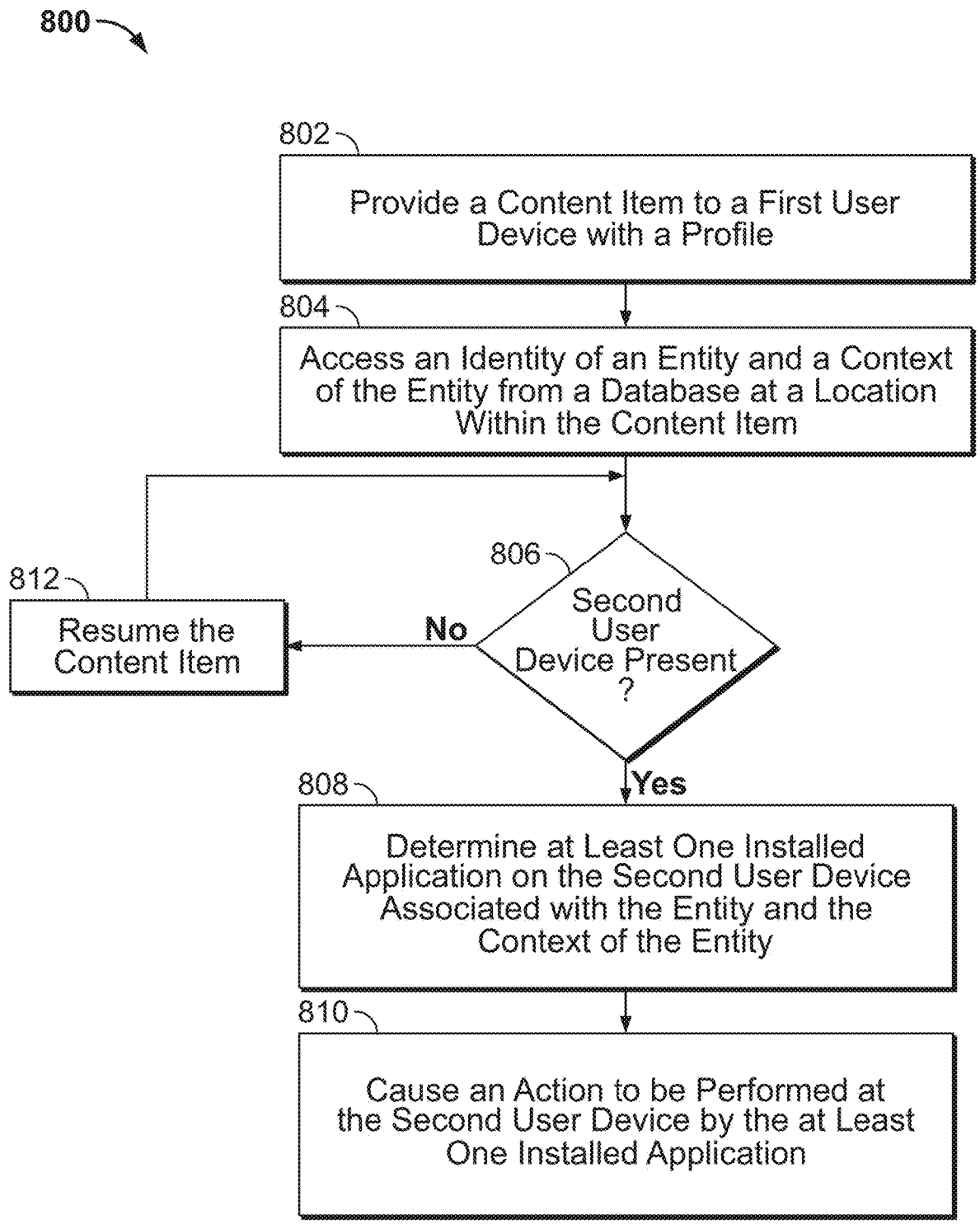
FIG. 8 shows a flowchart of illustrative steps for identifying the entity by accessing an identity of the entity from a storage device prior to providing the content item, in accordance with some embodiments of the present disclosure.

FIG. 8 shows a flowchart of illustrative steps for identifying the entity by accessing an identity of the entity from a storage device prior to providing the content item, in accordance with some embodiments of the present disclosure. The phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, smart devices, gaming consoles, gaming media, or any other suitable fixed or removable storage devices, and/or any combination of the same. The storage device may include storage 308 (e.g., RAM, ROM, hard disk, removable disk, etc.). The content management application, including control circuitry, for example, control circuitry 304 or 400, may execute the process 800. The control circuitry may be a part of user equipment (e.g., user television equipment 502, user computer equipment 504, other connected devices 528, or wireless user communications device 506) or of a remote server separated from the user equipment by way of a communications network, or distributed over a combination of both. It should be noted that process 800, or any steps thereof, could be performed on, or provided by, any of the devices show in FIGS. 1-7 and can incorporate various user interfaces (e.g., user input interface 310 of FIG. 3).

The process 800 begins at step 802, where the content management application, involving user equipment (e.g., user television equipment 502, user computer equipment 504, other connected devices 528, or wireless user communications device 506), provides the content item to the first user device with the profile. For example, the user may log on to their account (e.g., their profile) for the OTT content provider (e.g., the media content source 516) on any user equipment (e.g., user television equipment 502, user computer equipment 504, other connected devices 528, or wireless user communications device 506) (i.e., the first user device) to access the content item. In addition to the OTT content provider account, the profile may be the user's computer network, Wi-Fi network, or the communications network 514. The content management application may output the content item for display on display 312, and the user may select which content item they wish to view via the user input interface 310. As another example, the user television equipment 502 may provide the content item by accessing the cloud storage service (e.g., a content database 524) by connecting to the home Wi-Fi network (i.e., the profile).

At step 804, the content management application accesses, from a database, the identity of the entity and the context of the entity at the location within the content item. The content database 524 may store the identity of the entity and the context of the entity (i.e., entity and context information 526), and the media content source 516, the user profile database 518, the user television equipment 502, the user computer equipment 504, the other connected devices 528, and the wireless user communications device 506 may store at least part of the identified entity and the context of the entity (i.e., entity and context information 526). In some embodiments, the content management application may store the identification of the entity and the context of the entity at the storage device prior to providing the content item. Table 2 illustrates an exemplary format the database may store the entity (i.e., data point) and the context of the entity (i.e., type of reference) at the location within the content item.

TABLE 2

| Content Id | Segment | Time | Data point | Type of reference |
|---|---|---|---|---|
| 12234 | 345 | 23 min 12 sec | Queensland | Drive to |
| 12234 | 456 | 43 min 56 sec | Sydney Correctional Centre | Escape |
| 12234 | 871 | 45 min 12 sec | Heart rate | Monitor |
| 12234 | 888 | 47 min 42 sec | Popcorn | Cook |

In this example, the database (e.g., content database 524), may store the entity (e.g., Queensland), the context of the entity (e.g., Drive to), and the location within the content item (e.g., content segment 345 at time 23:12) prior to the content management application providing the content item. As shown above, the database may store multiple entities and contexts of entities at a plurality of locations within the content item. The table discussed above is intended to be illustrative and not limiting. Various features, processes, and components of FIGS. 1-7 may implement the table discussed above. One skilled in the art would appreciate that the steps discussed above may be omitted, modified, combined, and/or rearranged, and any additional steps may be performed without departing from the scope of the invention.

At step 806, the content management application determines the presence of the second user device 108. For example, the content management application may determine the presence of the second user device 108 connected to the user's Wi-Fi network, computer network, or communications network 514. The second user device 108 may be the user television equipment 502, the user computer equipment 504, the other connected devices 528, or the wireless user communications device 506. In addition, the second user device 108 may be any device that can connect to the network or another device can control. If the content management application fails to detect the presence of the second user device 108 ("No" at 806), the process 800 may proceed to step 812 and resume the content item. If the content management application detects the presence of the second user device 108 ("Yes" at 806), the process 800 may proceed to step 808.

At step 808, the content management application determines the at least one application on the second user device 108 associated with the entity and the context of the entity. For example, if the character in the content item were to drive to Queensland, the content management application may identify the entity as "Queensland," identify the context of the entity as "Drive to," and, after determining the presence of a mobile device connected to the user's Wi-Fi network, may determine that the "Maps" application on the mobile device associates with the entity and the context of the entity (e.g., Drive to Queensland). In some embodiments, the content management application may determine the at least one application (e.g., "Maps") associates with the entity and the context of the entity (e.g., Drive to Queensland) by utilizing comparison circuitry 424.

At step 810, the content management application causes an action to be performed at the second user device 108 by the at least one application. For example, as described above, after determining the "Maps" application on the second user device 108 associates with the entity and the context of the entity (e.g., Drive to Queensland), the content management application may launch the "Maps" application to chart a path from either the user's location, or the character's location in the content item, to Queensland. In some embodiments, the command in the format recognizable by at least one of the second user device 108 or the at least one application 112 may be necessary to perform the action. In some embodiments, the command format may be Device: App: Function: [Parameters].

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for providing an immersive content consumption experience for a profile, the method comprising:

providing a content item for a first user device associated with the profile;

identifying, using processing circuitry, an entity within a segment of the content item;

identifying, using the processing circuitry, a context of the entity within the segment of the content item;

identifying an action being performed within the segment of the content item with respect to the entity in relation to the context;

identifying, using the processing circuitry, and based at least in part on the entity and the context, a presence of a second user device associated with the profile that is physically in a vicinity to but is distinct from the first user device;

identifying, using the processing circuitry, and based on the entity and the context, at least one application installed on the second user device, wherein the at least one application can execute a particular action at the second user device corresponding to the identified action being performed within the segment of the content item, provided at the first user device, with respect to the entity in relation to the context; and based at least in part on the identifying the presence of the second user device is physically in the vicinity but is distinct from the first user device, transmitting a command from the first user device to the second user device, the command from the first user device instructing the at least one application on the second user device to perform the particular action at the second user device by the at least one application.

2. The method of claim 1, wherein the identifying the entity within the segment of the content item and the identifying the context of the entity within the segment of the content item comprise processing the content item, while providing the content item, in real time to identify the entity within the segment of the content item and the context within the segment of the content item.

3. The method of claim 2, further comprising storing information, concurrently with processing and providing the content item, about the identified entity within the segment of the content item and about the identified context of the entity within the segment of the content item.

4. The method of claim 2, further comprising triggering, by a user action, the identifying the entity within the segment of the content item.

5. The method of claim 1, wherein the identifying the entity within the segment of the content item comprises accessing an identity of the entity from a storage device in which the identity of the entity was stored prior to the providing the content item.

6. The method of claim 1, wherein the identifying the entity within the segment of the content item further comprises at least one of processing closed captioning, using natural language processing on the content item, or using computer vision technique on the content item.

7. The method of claim 1, further comprising providing a selectable option on the first user device associated with the entity and the context.

8. The method of claim 1, wherein the identifying the presence of the second user device associated with the profile comprises determining the presence of an appliance associated with the profile.

9. The method of claim 1, wherein the identifying the presence of the second user device associated with the profile comprises detecting the second user device on a computer network shared with the first user device.

10. The method of claim 1, wherein the command is generated in a format recognizable by at least one of the second user device or the at least one application to perform the action.

11. A system for providing an immersive content consumption experience for a profile, the system comprising:
a communication port; and
control circuitry communicably coupled to the communication port and configured to:
provide a content item for a first user device associated with the profile;
identify, using processing circuitry, an entity within a segment of the content item;
identify, using the processing circuitry, a context of the entity within the segment of the content item;
identify an action being performed within the segment of the content item with respect to the entity in relation to the context;
identify, using the processing circuitry, and based at least in part on the entity and the context, a presence of a second user device associated with the profile that is physically in a vicinity to but is distinct from the first user device;
identify, using the processing circuitry, and based on the entity and the context, at least one application installed on the second user device, wherein the at least one application can execute a particular action at the second user device corresponding to the identified action being performed within the segment of the content item, provided at the first user device, with respect to the entity in relation to the context; and
based at least in part on the identifying the presence of the second user device is physically in the vicinity but is distinct from the first user device, transmit, using the processing circuitry, a command from the first user device to the second user device, the command from the first user device instructing the at least one application on the second user device to perform the particular action at the second user device by the at least one application.

12. The system of claim 11, wherein the identifying the entity within the segment of the content item and the identifying the context of the entity within the segment of the content item comprise processing the content item, while providing the content item, in real time to identify the entity within the segment of the content item and the context within the segment of the content item.

13. The system of claim 12, further comprising storing information, concurrently with processing and providing the content item, about the identified entity within the segment of the content item and about the identified context of the entity within the segment of the content.

14. The system of claim 12, further comprising triggering, by a user action, the identifying the entity within the segment of the content item.

15. The system of claim 11, wherein the identifying the entity within the segment of the content item comprises accessing an identity of the entity from a storage device in which the identity of the entity was stored prior to the providing the content item.

16. The system of claim 11, wherein the identifying the entity within the segment of the content item further comprises at least one of processing closed captioning, using natural language processing on the content item, or using computer vision technique on the content item.

17. The system of claim 11, further comprising providing a selectable option on the first user device associated with the entity and the context.

18. The system of claim 11, wherein the identifying the presence of the second user device associated with the profile comprises determining the presence of an appliance associated with the profile.

19. The system of claim 11, wherein the identifying the presence of the second user device associated with the profile comprises detecting the second user device on a computer network shared with the first user device.

20. The system of claim 11, wherein the command is generated in a format recognizable by at least one of the second user device or the at least one application to perform the action.

* * * * *